(12) United States Patent
Roper et al.

(10) Patent No.: US 11,141,888 B1
(45) Date of Patent: *Oct. 12, 2021

(54) HOLLOW POLYMER MICRO-TRUSS STRUCTURES CONTAINING PRESSURIZED FLUIDS

(71) Applicant: HRL LABORATORIES, LLC, Malibu, CA (US)

(72) Inventors: Christopher S. Roper, Santa Monica, CA (US); William B. Carter, Calabasas, CA (US); Alan J. Jacobsen, Woodland Hills, CA (US); Kevin J. Maloney, Los Angeles, CA (US); Robert E. Doty, Los Angeles, CA (US); Tobias A. Schaedler, Oak Park, CA (US); Adam E. Sorensen, Glendale, CA (US); Andrew P. Nowak, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,195

(22) Filed: Nov. 18, 2019

Related U.S. Application Data

(62) Division of application No. 15/340,588, filed on Nov. 1, 2016, now Pat. No. 10,513,056, which is a division
(Continued)

(51) Int. Cl.
*B29C 33/44* (2006.01)
*E04C 3/28* (2006.01)
(Continued)

(52) U.S. Cl.
CPC .............. *B29C 33/448* (2013.01); *B05D 1/60* (2013.01); *B29C 33/40* (2013.01); *B29C 41/02* (2013.01); *B32B 3/20* (2013.01); *B32B 3/26* (2013.01); *E04C 3/28* (2013.01); *B29K 2086/00* (2013.01); *B29K 2881/00* (2013.01)

(58) Field of Classification Search
CPC ................ B32B 3/26; B32B 3/20; E04C 3/28
See application file for complete search history.

(56) References Cited

U.S. PATENT DOCUMENTS

| | | |
|---|---|---|
| 1,964,818 A | 7/1934 | Hood |
| 2,591,829 A | 4/1952 | Katzenmeyer et al. |
| (Continued) | | |

OTHER PUBLICATIONS

Cadogan, "Rigidization Mechanisms and Materials," *Gossamer Spacecraft: Membrane and Inflatable Structures Technology for Space Applications*, vol. 191 Progress in Astronautics and Aeronautics, (2000), Chapter 7, pp. 257-279.

(Continued)

*Primary Examiner* — Hai Vo
(74) *Attorney, Agent, or Firm* — Lewis Roca Rothgerber Christie, LLP

(57) ABSTRACT

An ordered, 3-dimensional, micro-scale, open-cellular truss structure including interconnected hollow polymer tubes. The hollow micro-truss structure separates two fluid volumes which can be independently pressurized or depressurized to control flow, or materials properties, or both. Applications for this invention include deployable structures, inflatable structures, flow control, and vented padding.

4 Claims, 14 Drawing Sheets

Related U.S. Application Data of application No. 13/618,616, filed on Sep. 14, 2012, now Pat. No. 9,527,261.

(51) Int. Cl.

| | |
|---|---|
| *B32B 3/26* | (2006.01) |
| *B29C 41/02* | (2006.01) |
| *B29C 33/40* | (2006.01) |
| *B05D 1/00* | (2006.01) |
| *B32B 3/20* | (2006.01) |
| *B29K 86/00* | (2006.01) |

(56) References Cited

U.S. PATENT DOCUMENTS

| | | |
|---|---|---|
| 2,754,836 A | 7/1956 | Darby |
| 2,819,724 A | 1/1958 | Barker |
| 3,137,307 A | 6/1964 | Scurlock |
| 3,148,391 A | 9/1964 | Whitney |
| 3,309,714 A | 3/1967 | Porten |
| 3,327,308 A | 6/1967 | Henjum |
| 3,552,072 A | 1/1971 | O'Connell |
| 3,653,083 A | 4/1972 | Lapidus |
| 3,785,375 A | 1/1974 | Lipson |
| 3,994,102 A | 11/1976 | Johnson et al. |
| 4,170,998 A | 10/1979 | Sauder |
| 4,288,947 A | 9/1981 | Huang |
| 4,391,009 A | 7/1983 | Schild et al. |
| 4,547,919 A | 10/1985 | Wang |
| 4,624,248 A | 11/1986 | Poole et al. |
| 4,807,405 A | 2/1989 | Borgquist |
| 4,825,599 A | 5/1989 | Swann, Jr. |
| 4,876,829 A | 10/1989 | Mattick |
| 4,898,160 A | 2/1990 | Brownlee |
| 4,899,749 A | 2/1990 | Laroco |
| 4,918,877 A | 4/1990 | Dutka |
| 4,969,880 A | 11/1990 | Zamierowski |
| 5,044,579 A | 9/1991 | Bernasconi et al. |
| 5,305,483 A | 4/1994 | Watkins |
| 5,483,711 A | 1/1996 | Hargest et al. |
| 5,645,314 A | 7/1997 | Liou |
| 5,675,852 A | 10/1997 | Watkins |
| 5,743,049 A | 4/1998 | Thallemer |
| 5,887,304 A | 3/1999 | Von der Heyde |
| 5,990,851 A | 11/1999 | Henderson et al. |
| 6,052,853 A | 4/2000 | Schmid |
| 6,053,882 A | 4/2000 | Johansen |
| 6,120,469 A | 9/2000 | Bruder |
| 6,224,538 B1 | 5/2001 | Wang et al. |
| 6,280,759 B1 | 8/2001 | Price et al. |
| 6,336,237 B1 | 1/2002 | Schmid |
| 6,615,427 B1 | 9/2003 | Hailey |
| 6,726,285 B2 | 4/2004 | Caruso et al. |
| 6,904,629 B2 | 6/2005 | Wu |
| 6,931,812 B1 | 8/2005 | Lipscomb |
| 7,059,682 B2 | 6/2006 | Caruso et al. |
| 7,195,624 B2 | 3/2007 | Lockwood et al. |
| 7,250,034 B2 | 7/2007 | Barberio |
| 7,382,959 B1 | 6/2008 | Jacobsen |
| 7,574,830 B2 | 8/2009 | Baker |
| D600,051 S | 9/2009 | Parker et al. |
| D604,969 S | 12/2009 | Parker et al. |
| D608,406 S | 1/2010 | Cobb, II et al. |
| 7,653,276 B1 * | 1/2010 | Gross .................. F28D 20/023 385/46 |
| 7,653,279 B1 | 1/2010 | Jacobsen |
| D615,784 S | 5/2010 | Parker et al. |
| 7,841,666 B2 | 11/2010 | Schmitz et al. |
| 7,896,864 B2 | 3/2011 | Lockwood et al. |
| 7,910,791 B2 | 3/2011 | Coffey |
| D639,091 S | 6/2011 | Behar et al. |
| 8,353,240 B1 | 1/2013 | Schaedler et al. |
| 8,573,289 B1 | 11/2013 | Roper et al. |
| 8,579,018 B1 | 11/2013 | Roper et al. |
| 9,116,428 B1 | 8/2015 | Jacobsen et al. |
| 9,229,162 B1 | 1/2016 | Roper et al. |
| 9,415,562 B1 * | 8/2016 | Schaedler .............. C04B 30/02 |
| 9,453,604 B1 * | 9/2016 | Maloney .............. B29C 33/448 |
| 9,527,261 B1 * | 12/2016 | Roper .................. B05D 1/60 |
| 2004/0031208 A1 * | 2/2004 | Visser .................. E04H 15/20 52/2.17 |
| 2004/0123980 A1 * | 7/2004 | Queheillalt ......... F28D 15/0275 165/133 |
| 2008/0183268 A1 | 7/2008 | Bates et al. |
| 2008/0295417 A1 | 12/2008 | Turcot |
| 2009/0249701 A1 | 10/2009 | Turcot |
| 2010/0160843 A1 | 6/2010 | Neely |
| 2010/0268136 A1 | 10/2010 | Der Ovanesian |
| 2011/0152735 A1 | 6/2011 | Barberio |
| 2013/0143060 A1 | 6/2013 | Jacobsen et al. |

OTHER PUBLICATIONS

Campbell, et al., "Mission Concepts and Systems: Space Inflatable Radiometer System Concept," *Gossamer Spacecraft: Membrane and Inflatable Structures Technology for Space Applications*, vol. 191 Progress in Astronautics and Aeronautics, (2000), Chapter 16, pp. 433-448.

Chmielewski, "Advanced Concepts," *Gossamer Spacecraft: Membrane and Inflatable Structures Technology for Space Applications*, vol. 191 Progress in Astronautics and Aeronautics, (2000), Chapter 22, pp. 553-572.

Chmielewski, "Overview of Gossamer Structures," *Gossamer Spacecraft: Membrane and Inflatable Structures Technology for Space Applications*, vol. 191 Progress in Astronautics and Aeronautics, (2000), Chapter 1, pp. 1-33.

Doty, et al. "Hierarchical Polymer Microlattice Structures," *Advanced Engineering Materials*, DOI: 10.1002/adem. 201200007, (2012), pp. 1-5.

Freeland, "History of Relevant Inflatable High-Precision Space Structures Technology Developments," *Gossamer Spacecraft: Membrane and Inflatable Structures Technology for Space Applications*, vol. 191 Progress in Astronautics and Aeronautics, (2000), Chapter 2, pp. 35-47.

Lassiter, et al., "Testing of Thin-Film Inflatable Structures," *Gossamer Spacecraft: Membrane and Inflatable Structures Technology for Space Applications*, vol. 191 Progress in Astronautics and Aeronautics, (2000), pp. 342-358.

Ashby, M.F. et al., "Metal Foams: A Design Guide" (Butterworth-Heinemann, Burlington, MA, 2000) pp. 251, Chapter 2 and 4.

BASF Corp., "Materials Safely Data Sheet for Basotect V3012" (2007) http://www.basf.co.kr/02_produds/01_thermoplasticslspe/document/MSDS-Basotect%20V3012.pdf.

Bouwhuis et al., "Mechanical properties of hybrid nanocrystalline metal foams," ACTA Materialia, vol. 57, No. 14, Jun. 2009, pp. 4046-4053.

Brazier, L.G., "On the Flexure of Thin Cylindrical Shells and Other "Thin" Sections," Proceedings of the Royal Society of London. Series A, 116, No. 773 (1927), pp. 104-114.

Butler, J.E. et al., "The CVD of Nanodiamond Materials," Chem. Vap. Deposition 14, 145-160 (2008).

Cao, A. et al., "Super-Compressible Foamlike Carbon Nanotube Films," Science 310 1307-1310 (2005).

Chang, S.Y. et al., "Mechanical properties and deformation behavior of amorphous nickel-phosphorous films measured by nanoindentation test" Metall Mater Trans A 37A 2939-2945 (2006).

Deshpande, V.S. et al., "Foam topology bending versus stretching dominated architectures," Acta Materialia. 49 1035-1040 (2001).

Evans, et at, "Concepts for enhanced energy absorption using hollow micro-lattices," International Journal of Impact Engineering, vol. 37. No. 9. Apr. 2010 (Apr. 2010), pp. 947-959, XP055145047.

Fink et al., "Fluid Dynamics of Flow Through Microscale Lattice Structures Formed from Self-Propagating Photopolymer Waveguides," AIChE Journal, 57(10):2636-2646, Oct. 2011.

Fink, "Micro-truss structures as cross-flow heat exchangers," HRL Laboratories, LLC, Dec. 1, 2010, 32 pages.

Gibson, L.J. et al., "Cellular Solids: Structure and Properties" (Cambridge Univ. Press, Cambridge, UK. 1997), Chapter 5.

(56) References Cited

OTHER PUBLICATIONS

Guinness Book of World Records, Least Dense Solid, 2003, http://www.guinnessworldrecords.com/Search/DetaiLs/Least-dense-solid/47186.htm.

Hexcel Corp., HexWeb™ Honeycomb Attributes and Properties, (Datasheet 1999). http://www.hexcel.com/Resources/DataSheets/Brochure-Data-Sheets/Honeycomb_Attributes_and_Properties.pdf.

Jacobsen, A.J. et al., "Shear behavior of polymer micro-scale truss structures formed from self-propagating polymer waveguides." Acta Materialia 56 2540-2548 (2008).

Jacobsen, A.J. et al., "Compression behavior of micro-scale truss structures formed from self-propagating polymer waveguides," Acta Materialia 55 6724-6733 (2007).

Jacobsen, A.J. et al., "Micro-scale Truss Structures formed from Self-Propagating Photopolymer Waveguides" Advanced Materials 19 3892-3896 (2007).

Jacobsen, A.J. et al., "Micro-scale truss structures with three-fold symmetry formed from self-propagating polymer waveguides" Acta Materialia (2008), vol. 56, Publisher: Elsevier, pp. 2540-2548, XP022699324, ISSN: 1359-6454, DOI: 10.1016/J.ACTAMAT.2008.01.051.

Jacobsen, et al., "Interconnected self-propagating photopolymer waveguides: an alternatve to stereolithography for rapid formation of lattice-based open-cellar materials," Twenty First Annual International Solid Freeform Fabracation Symposium—An Additive Manufacturing Conference, 2010, pp. 846-853.

Lakes, R.S., "Materials with structural hierarchy." Nature 361 511-515 (1993).

Lian, J., et al., "Catastrophic vs. gradual collapse of thin-walled nanocrystalline Ni cylinders as building blocks of micro-lattice structures," Nano Letters 11 p. 4118 (2011).

Maloney, K.J. et al., Multifunctional Heat Exchangers Derived from Three-Dimensional Micro-Lattice Structures, International Journal of Heat and Mass Transfer, 2012, 8 pages.

Mecklenburg et al., Aerographite: "Ultra Lightweight, Flexible Nanowall, Carbon Microtube Material with Outstanding Mechanical Performance," Advanced Materials (2012).

Mills, N.J., "Finite Element Models for the viscoelasticity of open-cell polyurethane foam," Cellular Polymers 5 293-316 (2006).

Park, S.H. et al., "A study on the microstructure and phase transformation of electroless nickel deposits," Journal of Materials Science 23 1643-1654 (1988).

Roper, C.S. et al., Scalable 3D Bicontinuous Fluid Networks: Polymer Heat Exchangers Toward Artificial Organs, Advanced Materials, Mar. 5, 2015, 6 pages.

Schaedler, T.A, et al., "Ultralight Metallic Microlattices" Science 334 (Nov. 2011) 962-965.

Smits, G.F.,"Effect of Cellsize Reduction on Polyurethane Foam Physical Properties Reduction," Journal of Building Physics 17, 309-329 (1994).

"Synthesis of open-cell metal foams by templated directed vapor deposition," Journal of Materials Research 16 (4): 1028-1036.

Tappan, B.C. et al., "Ultralow-Density Nanostructured Metal Foams: Combustion Synthesis, Morphology, and Composition," J. Am. Chem. Soc. 128 6589-6594 (2006).

Trelewicz, J.R. et al., "The Hall-Petch breakdown in nanocrystalline metals: A crossover to glass-like deformation," Acta Materialia 55 5948-5958 (2007).

Verdooren, A. et al., "Fabrication of Low-Density Ferrous Metallic Foams by Reduction of Chemically Bonded Ceramic Foams." J. Am. Ceram. Soc. 89 3101 3106 (2006).

Young, W.C., et al., Roark's Formulas for Stress and Strain (McGraw-Hill, New York ed. 7 2002) p. 735.

Zou, J. et al., "Ultralight Multiwalled Carbon Nanotube Aerogel," ACS Nano 4 7293-7302 (2010).

\* cited by examiner

HOLLOW POLYMER MICRO-TRUSS STRUCTURES CONTAINING PRESSURIZED FLUIDS

CROSS-REFERENCE TO RELATED PATENTS

This application is a divisional of U.S. patent application Ser. No. 15/340,588, filed on Nov. 1, 2016, which is a divisional of U.S. patent application Ser. No. 13/618,616, filed on Sep. 14, 2012, now U.S. Pat. No. 9,527,261, issued on Dec. 27, 2016, the entire contents of all of which are incorporated herein by reference. In addition, the present application incorporates by reference in its entirety, as if set forth in full, U.S. Pat. No. 7,653,279 ("the '279 Patent"), and U.S. Pat. No. 7,382,959 ("the '959 Patent").

FIELD

The following description relates to compliant porous materials and more particularly to the fabrication and use of hollow polymer micro-truss structures for and in applications requiring such materials.

BACKGROUND

Compliant porous materials have numerous applications in consumer products and in medicine. In automobiles, for example, random, open cell foams may be used as a cushioning material in seating, headrests, and armrests. Such foam may inhibit the flow of air more than is desired, compromising the comfort of the user, and the mass of such foam padding may be a factor in the design of the automobile.

In the medical industry, various materials are used for casts, wound care pads, padding, prostheses, bedding, and mobility devices. Ideally, such a material would allow the circulation of air through the material, and provide some measure of structural strength, so that it may be suitable for immobilizing a portion of the patient if used as a cast, or for supporting the patient's weight if used as bedding. In many of these applications, continuous contact with, or pressure on, the patient's skin may cause harm to the skin, such as bedsores, by affecting aeration of the skin and subcutaneous circulation. In such applications it is desired that the material used be permeable to air, and avoid forming regions of high pressure which may affect the patient's circulation.

Moreover, in health care applications it may be beneficial to apply a partial vacuum to the patient's skin to aid in wound healing or to accelerate the evaporation of surface moisture which otherwise may promote pathologies. It also may be beneficial for the health care provider to be able to adjust certain characteristics of the material, such as its stiffness and its permeability. The ability to adjust the stiffness, for example, may make it possible to adjust the immobilizing capacity of a cast until it is just adequate, so as to produce as little patient discomfort as possible.

A material with adjustable physical properties may also have applications in other fields, such as in making deployable structures for space. Like an inflatable structure, an adjustable stiffness material may be maintained stowed by a stowing restraint during launch and then after launch its stiffness may be increased allowing it to resume its original shape.

Thus, there is a need for a porous, permeable, compliant material, the physical properties of which may be adjusted after fabrication.

SUMMARY

Aspects of embodiments of the present invention are directed toward a hollow polymer micro-truss structure which may be fabricated using an ordered three dimensional microstructure of polymer waveguides as a sacrificial scaffold. To fabricate the hollow polymer micro-truss structure, the sacrificial scaffold may be coated with a polymer coating, and the sacrificial scaffold may then be removed, for example by etching, to leave behind a hollow structure composed of polymer tubes. The tubes may enclose an interior fluid volume, the pressure of which may be changed to change the dimensions and other properties of the hollow polymer micro-truss structure. The exterior fluid volume, i.e., the fluid volume exterior to the tubes, may also contain a fluid under controlled pressure, or it may provide a region through which a fluid flows. For example the mechanical stiffness hollow polymer micro-truss structure, or the resistance to flow of a fluid in the exterior fluid volume, may be controlled by changing the pressure of the fluid in the interior fluid volume. Such a hollow polymer micro-truss structure may have a wide range of applications, including cushioning, casts, bandages, and control structures.

According to an embodiment of the present invention there is provided a three-dimensional hollow micro-truss, including: at least three sets of interconnected hollow tubes extending along at least three different directions; the at least three sets of interconnected hollow tubes intersecting each other at a plurality of hollow nodes to form a structure; the hollow tubes and the hollow nodes having interior surfaces collectively enclosing a first fluid region; the hollow tubes and the hollow nodes having exterior surfaces defining a second fluid region; the first fluid region containing a first fluid; the second fluid region containing a second fluid; and the pressure of the first fluid region being greater than or less than the pressure of the second fluid region.

In one embodiment, the first fluid is selected from the group consisting of liquids, gases, rarefied gases, two-phase fluids, multicomponent fluids, and combinations thereof.

In one embodiment, the second fluid is selected from the group consisting of liquids, gases, rarefied gases, two-phase fluids, multicomponent fluids, and combinations thereof.

In one embodiment, the hollow tubes have a first fluid access port for adding fluid to or removing fluid from the first fluid region to control the pressure in the first fluid region.

In one embodiment, the hollow tubes are sufficiently elastic for pressure changes in the first fluid region to affect a resistance, in the second fluid region, to flow of the second fluid.

In one embodiment, the hollow tubes are sufficiently elastic for pressure changes in the first fluid region to affect a mechanical property of the hollow micro-truss.

In one embodiment, the mechanical property is selected from the group consisting of stiffnesses and strengths, and combinations thereof.

In one embodiment, the hollow tubes are sufficiently elastic for pressure changes in the first fluid region to affect a dimension of the hollow micro-truss.

According to an embodiment of the present invention there is provided a micro-truss device including: a three-dimensional hollow micro-truss extending throughout a three-dimensional volume; and a face sheet abutting, and bonded to, the three-dimensional micro-truss over at least a portion of the surface of the three-dimensional volume.

In one embodiment, the hollow tubes include a first fluid access port for adding fluid to or removing fluid from the first fluid region to control the pressure in the first fluid region.

In one embodiment, the device has a second fluid access port for adding fluid to or removing fluid from the second fluid region to control the pressure in the second fluid region.

In one embodiment, the hollow tubes are sufficiently elastic for pressure changes in the second fluid region to affect a resistance, in the first fluid region, to flow of the first fluid.

In one embodiment, the hollow tubes are sufficiently elastic for pressure changes in the second fluid region to affect a mechanical property of the hollow micro-truss.

In one embodiment, the mechanical property is selected from the group consisting of stiffnesses and strengths, and combinations thereof.

In one embodiment, the hollow tubes are sufficiently elastic for pressure changes in the second fluid region to affect a dimension of the hollow micro-truss.

According to an embodiment of the present invention there is provided a method of fabricating a hollow polymer micro-truss, the method including: forming a three-dimensional micro-truss sacrificial scaffold, wherein the three-dimensional micro-truss sacrificial scaffold includes: a plurality of first truss elements defined by a plurality of first self-propagating polymer waveguides and extending along a first direction; a plurality of second truss elements defined by a plurality of second self-propagating polymer waveguides and extending along a second direction; a plurality of third truss elements defined by a plurality of third self-propagating polymer waveguides and extending along a third direction; forming a polymer coating on the sacrificial scaffold; and removing the sacrificial scaffold to form the hollow polymer micro-truss having hollow tubes with polymer walls; wherein the forming of the polymer coating includes configuring the polymer walls to be able to deform, after removal of the scaffold, to increase or decrease the inner diameter of the hollow tubes by an amount exceeding the thickness of the polymer walls without experiencing material failure.

In one embodiment, the sacrificial scaffold includes thiol-ene as a major component.

In one embodiment, the polymer coating includes parylene AF4 as a major component.

In one embodiment, the forming of the polymer coating includes configuring the polymer walls to be able to deform, after removal of the scaffold, to increase or decrease the inner diameter of the hollow tubes by an amount exceeding ten times the thickness of the polymer walls without experiencing material failure.

In one embodiment, the removing of the sacrificial scaffold includes etching out the scaffold using an etchant.

In one embodiment, the etchant includes, as a major component, a base solution.

In one embodiment, the base solution includes, as a major component, a substance selected from the group consisting of sodium hydroxides, potassium hydroxides, and combinations thereof.

In one embodiment, the removing of the sacrificial scaffold includes, after etching out the scaffold using the etchant, substituting for the etchant a liquid selected from the group consisting of isopropyl alcohols, liquid carbon dioxides, and combinations thereof.

In one embodiment, the removing of the sacrificial scaffold includes, after etching out the scaffold using the etchant, removing a liquid by freeze drying or supercritical drying.

According to an embodiment of the present invention there is provided a hollow micro-truss, including: at least three sets of interconnected hollow tubes extending along at least three different directions; the at least three sets of interconnected hollow tubes interpenetrating each other at a plurality of hollow nodes to form a self supporting structure; the at least three sets of interconnected hollow tubes having walls, the walls being configured such that the walls are capable of deforming to increase or decrease the inner diameter of the hollow tubes by an amount exceeding the thickness of the walls without experiencing material failure.

In one embodiment, the inner diameter of the hollow tubes is at least 10 microns and at most 2 millimeters.

In one embodiment, the wall thickness of the hollow tubes is at least 10 nanometers and at most 0.5 millimeters.

In one embodiment, the length of the hollow tubes is at least 40 microns and at most 25 millimeters.

In one embodiment, the walls are configured such that the walls are capable of deforming to increase or decrease the inner diameter of the hollow tubes by an amount exceeding ten times the thickness of the walls without experiencing material failure.

According to an embodiment of the present invention there is provided a method of forming a hollow complex microstructure, including: forming a three-dimensional open-cell foam sacrificial scaffold; forming a polymer coating on the foam sacrificial scaffold; and removing the sacrificial scaffold to form randomly arranged hollow regions with polymer walls.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of the presently preferred embodiments of hollow polymer micro-truss structures provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As used herein, the term "fluid" includes both liquid and gas. As denoted elsewhere herein, like element numbers are intended to indicate like elements or features.

Figure 1:
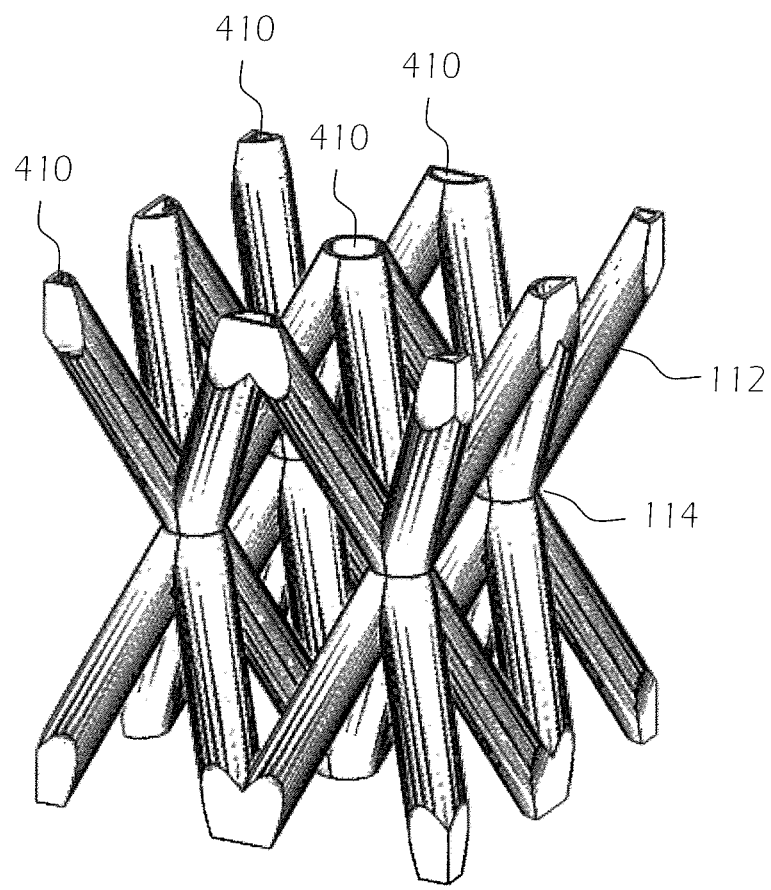
FIG. 1 is a perspective view of a hollow polymer micro-truss structure, according to an embodiment of the present invention, with a plurality of fluid access ports providing access to the interior fluid volume.

The present invention relates to hollow polymer micro-truss structures which separate two fluid volumes held at different pressures. Referring to FIG. 1, in one embodiment the hollow polymer micro-truss structure may be in the form of a regular lattice of intersecting tubes 112, configured with hollow nodes 114 at the intersections of the tubes, so that the interior of each tube 112 is in communication with any other tube it intersects. Thus the interiors of the tubes together form a single interior fluid volume, or first fluid volume which, if the ends of the tubes are sealed, is separate from the fluid volume exterior to the tubes, which may be referred to as the exterior fluid volume or the second fluid volume.

Figure 2:
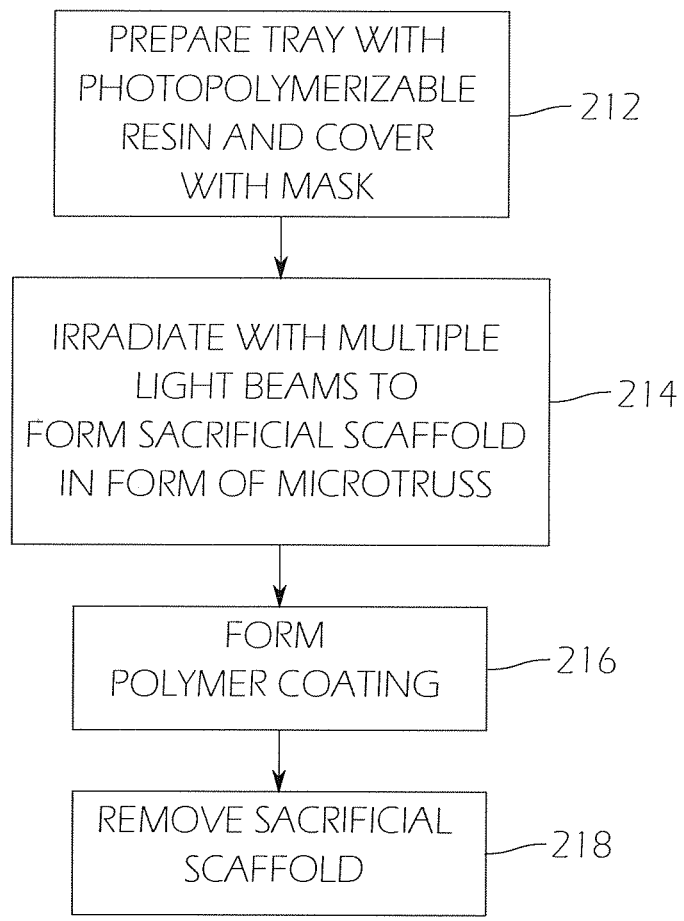
FIG. 2 is a flowchart illustrating the principal steps involved in fabricating a hollow polymer micro-truss structure according to an embodiment of the present invention.

Referring to FIG. 2, the tubes may be fabricated using as a template, or sacrificial scaffold, an ordered three dimensional (3D) microstructure of polymer waveguides, also known as a micro-truss, of the sort disclosed in the '959 Patent and in the '279 Patent. In an exemplary process for forming such a micro-truss sacrificial scaffold, a suitable photopolymerizable resin may, in step 212, be poured into a tray and covered with a mask having an array of holes. In step 214, the tray may be irradiated, through the mask, with collimated light. The collimated light entering the mask from a given direction through a given hole in the mask takes the shape of a beam of light in the resin, causing one or more chemical changes in the resin within the beam. These chemical changes may affect the index of refraction, and as a result the beam may cause a waveguide to form in the resin, which then in turn guides the beam along the path where the waveguide has already formed. In particular, in one embodiment of the present invention, the collimated light may cause the resin to polymerize, resulting in a micro-truss structure. The unreacted resin may then be washed away, leaving the micro-truss sacrificial scaffold. In step 216, the sacrificial scaffold may be coated with a suitable polymer, and in step 218, the sacrificial scaffold may be removed, by etching for example, to leave a structure of hollow tubes.

Figure 3A:
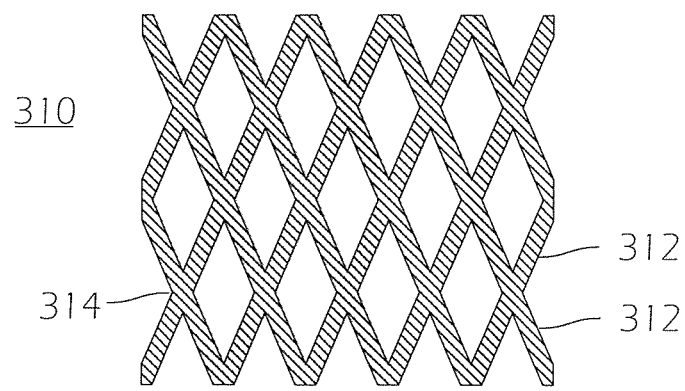
FIG. 3A is a cross-sectional view of a sacrificial scaffold used to fabricate a hollow polymer micro-truss structure in one embodiment of the present invention.
Figure 3B:
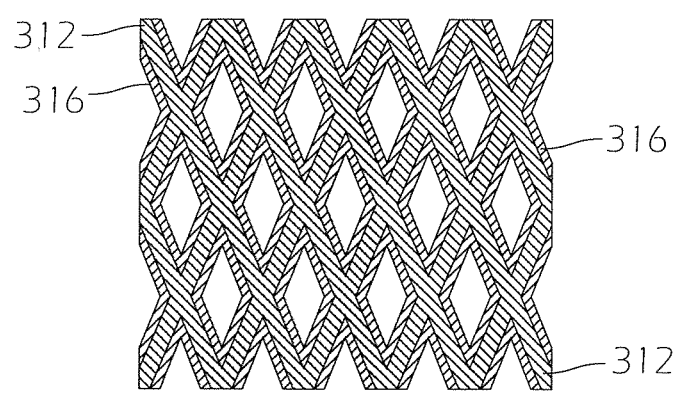
FIG. 3B is a cross-sectional view of the sacrificial scaffold of FIG. 3A with a polymer coating, an intermediate product in the fabrication of a hollow polymer micro-truss structure in one embodiment of the present invention.
Figure 3C:
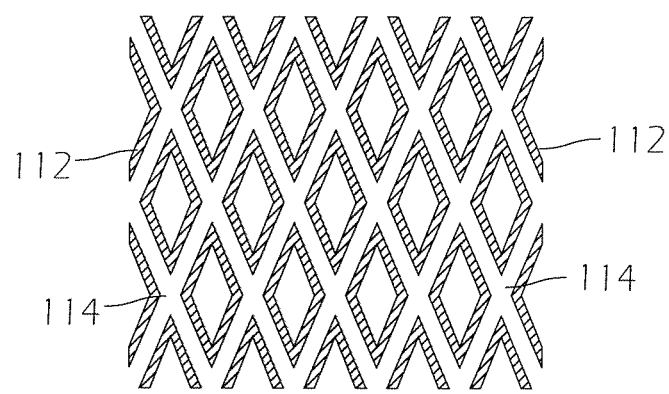
FIG. 3C is a cross-sectional view of a hollow polymer micro-truss structure formed, in one embodiment of the present invention, by removing the sacrificial scaffold from the intermediate product of FIG. 3B.

A cross-sectional view of the intermediate and final products of such a process is shown in FIGS. 3A-3C. Referring to FIG. 3A, a micro-truss sacrificial scaffold 310, having truss members 312 intersecting at nodes 314 may first be fabricated. Referring to FIG. 3B, after the micro-truss is formed, a polymer coating 316 may in a subsequent step be formed on the surfaces of the members 312 of the micro-truss, resulting in a polymer-coated micro-truss. Finally, referring to FIG. 3C, the micro-truss may then be removed, for example by etching, from within the polymer coating, leaving the coating only, in the form of a hollow polymer micro-truss structure comprising hollow tubes 112 intersecting at hollow nodes 114.

When forming the polymer coating it is preferable that the coating be highly conformal, i.e., that thickness variations be small, and preferably less than 10% of the total coating thickness throughout the polymer micro-truss structure. Further, if an etching process is used to remove the micro-truss sacrificial scaffold, the polymer coating must have etch selectivity to the micro-truss scaffold, so that the scaffold may be etched away without damaging the polymer coating. The preferred coating is the fluoropolymer parylene AF-4, also known as PARYLENE HT or parylene SF. Suitable coating processes include chemical vapor deposition, hot-wire chemical vapor deposition, and layer-by-layer assembly. Other coating materials may also be used, including, for example, parylene-N and parylene-C.

A base solution may preferably be used to selectively chemically etch out the micro-truss sacrificial scaffold. Suitable base solutions include solutions of sodium hydroxide (NaOH) or potassium hydroxide (KOH) in water. To penetrate effectively into the interiors of the tubes of the polymer micro-truss structure, the etch solution should preferably be chosen so that it wets into the micro-truss structure. If, for example, the polymer coating is a fluoropolymer, the preferred method is to use an etch solution of water, a low molecular weight alcohol such as methanol, and a base such as NaOH or KOH. In another embodiment, the micro-truss sacrificial scaffold may instead be burned out, by, for example, processing the assembly at elevated temperature in an oxygen atmosphere.

After the removal of the micro-truss sacrificial scaffold the tubes of the hollow polymer micro-truss structure may contain a liquid, as, for example, if an etchant is used to remove the micro-truss sacrificial scaffold. In this case, if the walls are sufficiently thin compared to the tube diameter and tube length that the structure may collapse under capillary forces, it is preferable to include a final step to avoid or reduce capillary forces when removing the liquid from the tubes. The preferred method for accomplishing this is freeze drying. The liquid to be removed may first be replaced by a solvent, such as water, methanol, or t-butanol, or a mixture of such solvents, and freeze drying may then be used to remove the solvent. The preferred method is to use successive solvent exchanges. For example, the etchant may first be replace with water, which may then be replaced with t-butanol. The exchange is made particularly effective if relatively large osmotic gradients are formed, forcing each liquid to exchange rapidly even in the smallest diameter tubes. The final and preferred solvent exchange ends with t-butanol, where, during freeze-drying, the thermal expansion and crystal size of the solvent are both small, and induced wall stresses are minimized. In another embodiment, supercritical drying, e.g. with carbon dioxide, may be used, after the liquid to be removed has first been replaced with liquid carbon dioxide.

In yet another embodiment, a second coating, e.g. a self-assembled monolayer, may be applied onto the polymer coating to reduce the surface energy and thereby reduce the capillary pressure. In particular, in a first step of one embodiment, the etchant used to remove the sacrificial scaffold may be replaced by a solvent, such as isopropyl alcohol. Then, in a subsequent step, this solvent may be replaced with another solvent in which molecules suitable for forming a self-assembled monolayer are dissolved. In another embodiment, these two steps may be combined into one by substituting the solution containing suitable molecules directly for the etchant. The molecules may then form a self-assembled monolayer on both the internal and external surfaces of the hollow polymer micro-truss structure. The self-assembled monolayer may then reduce capillary forces, to prevent collapse of the hollow polymer micro-truss structure during drying.

In one embodiment, a hollow polymer micro-truss structure with a tube wall material which does not have etch selectivity to the micro-truss sacrificial scaffold may be fabricated by first converting the micro-truss sacrificial scaffold to another material which does have etch selectivity to the desired wall material. This may be accomplished, for example, by using a casting process to make a duplicate of the micro-truss sacrificial scaffold in a suitable material. In another embodiment, the micro-truss sacrificial scaffold may be coated with a third material, e.g. through slurry coating or electrodeposition, the micro-truss sacrificial scaffold may be removed selectively to the third material, and the coating, of the desired polymer wall material, may be deposited on the third material. The third material may then be removed selectively to the polymer coating, leaving the hollow polymer micro-truss structure.

In one embodiment, the tubes may have an inner diameter between 10 microns (μm) and 2 millimeters (mm), and a wall thickness of between 10 nanometers (nm) and 0.5 mm. The overall length of any tube may be between 40 μm and 25 mm. The tube walls may be made of a polymer, and in particular, preferably of parylene AF-4 (also known as PARYLENE HT or parylene SF). It may be preferable for the polymer used to construct the hollow tube polymer micro-truss structures to be inherently pinhole free, as these preferred polymers are, when formed in thicknesses exceeding 1 micron. This enables a stable pressure difference between the interior fluid volume and the exterior fluid volume.

In one embodiment, the walls are able to deform when subjected to a force, such as a pressure difference between the fluid in the interior fluid volume and that in the exterior fluid volume. This deformation may be a change in the diameter of the tubes, or a change in the distance between nodes, or both. The deformation may also be buckling of one or more tubes or nodes in the structure.

Preferably the walls are able to deform, without failing, by an amount which allows the inner diameter of the hollow tubes to change by more than ten times the wall thickness. The term "material failure," as used herein, means sufficient material fracture to form a leak path between the interior and exterior fluid volumes such that a pressure differential can no longer be maintained between the two volumes.

The tubes need not all have the same dimensions. For example, if the holes in the mask have different diameters, then the corresponding truss members of the micro-truss sacrificial scaffold, and the tubes formed over those truss members, will also have different diameters. It is possible, therefore, to fabricate hollow polymer micro-truss structures in which the tubes intersecting at some nodes have different diameters, and in which the nodes are not all identical.

In one embodiment, each node in a hollow polymer micro-truss structure has symmetry. The symmetry group may be different for different nodes in the hollow polymer micro-truss structure. Possible symmetries include rotational symmetry, mirror symmetry, and inversion symmetry, and the preferred group symmetry is D4h, or ditetragonal-dipyramidal.

Various characteristics of the hollow polymer micro-truss structure may be controlled by varying the respective pressures in the interior and exterior fluid volumes. Where the first fluid and second fluid have different pressures across a node wall or tube wall, the wall will deform. By pressurizing one volume, the bulk mechanical properties of the micro-truss can be tuned, while still enabling fluid flow through the other volume. In one embodiment, a range of useful pressure differences may be 10 Pa to 100 MPa and a preferred range may be 100 Pa to 1 MPa.

Figure 4:
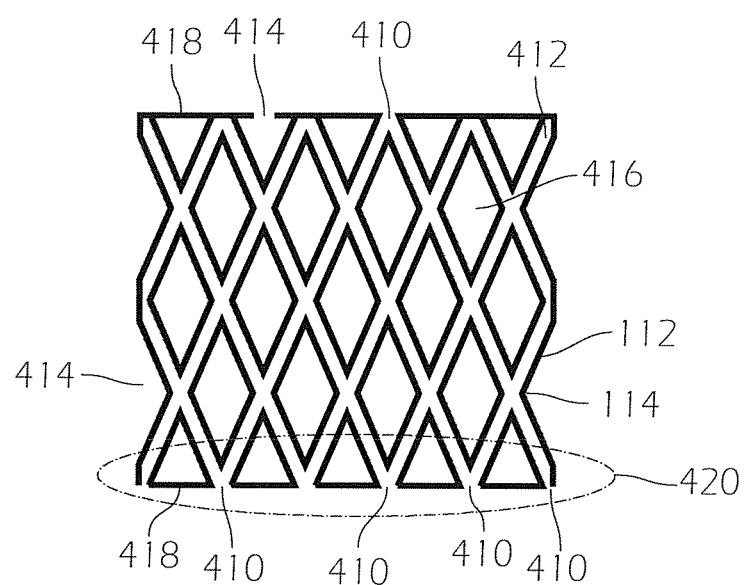
FIG. 4 is a cross-sectional view of a hollow polymer micro-truss structure with an interior fluid volume accessible through several fluid access ports, according to one embodiment of the present invention.

A number of embodiments of hollow polymer micro-truss structures, with different characteristics, may be fabricated. Referring to FIG. 4, access to the two fluid volumes may be provided via fluid access ports, such as fluid access ports 410 to the first fluid volume 412, and fluid access ports 414 to the second fluid volume 416. Face sheets 418 may be used to seal the second fluid volume over part or all of the outer surface of the hollow polymer micro-truss structure. These face sheets may be secured and sealed to the hollow polymer micro-truss structure using an adhesive such as epoxy, or by ultrasonic welding, or by any other suitable method. Holes may be formed in the face sheets 418 to provide fluid access ports 414 to the second fluid volume 416. A hole in a face sheet which coincides with the end of a tube may form a fluid access port 410 to the first fluid volume 412. Collections of fluid access ports may form a manifold 420, or several such manifolds. The absence of a face sheet over a larger region of the surface of the polymer micro-truss structure may also provide a fluid access port 414 to the second fluid volume 416. In FIG. 4, cross sections through the face sheets and the walls of the tubes are shown as heavy lines rather than cross-hatched areas, for clarity in light of their low thickness. Thus one or both of the fluid volumes may be accessible via one or more fluid access ports, and the pressure in a fluid volume accessible via a fluid access port may be controlled by adding more molecules of fluid through the fluid access port.

Figure 5:
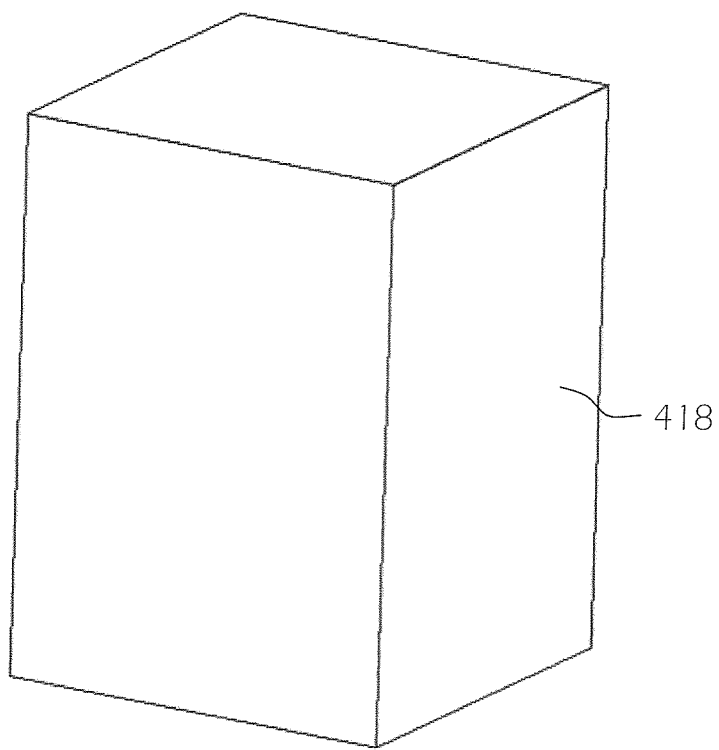
FIG. 5 is a perspective view of a hollow polymer micro-truss structure, with both interior and exterior fluid volumes sealed, fabricated according to an embodiment of the present invention.

Referring to FIG. 5, in one embodiment both the interior and exterior fluid volumes may be completely sealed, and the pressure in the fluid volumes may be controlled by an applied factor, such as temperature. This method of control may also be used when fluid access ports are present, such as in the exemplary embodiment illustrated in FIG. 4.

Figure 6A:
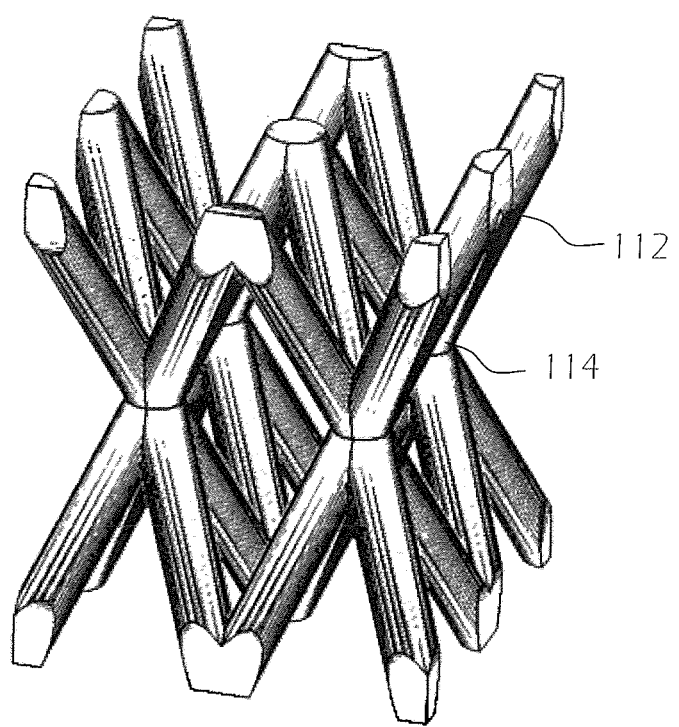
FIGS. 6A, 6B, 6C, and 6D are perspective views of hollow polymer micro-truss structures fabricated according to four embodiments of the present invention.
Figure 6B:
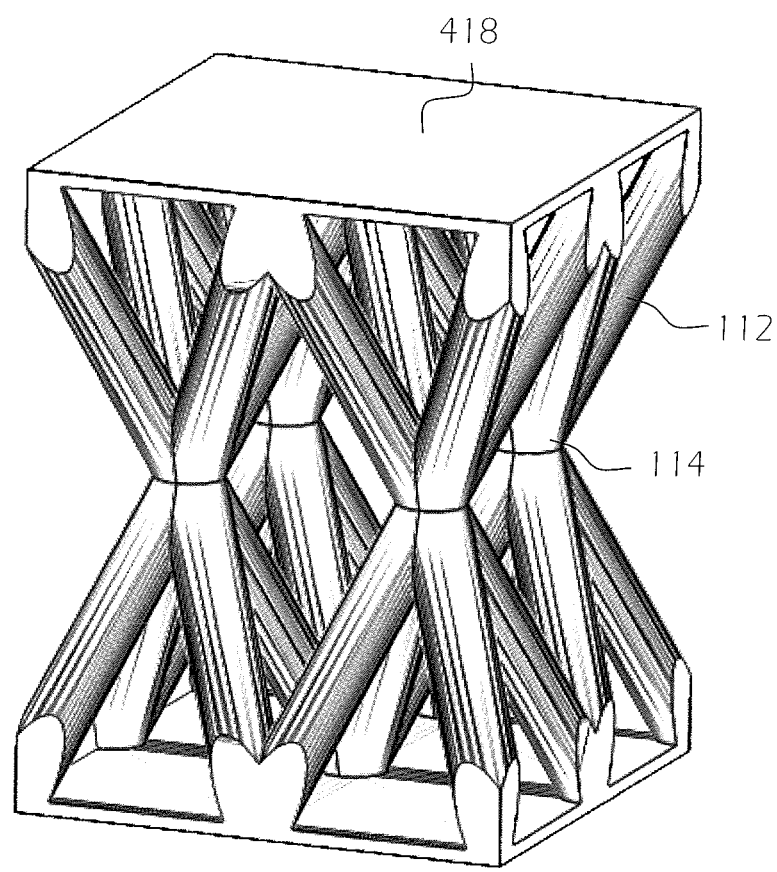
Figure 6C:
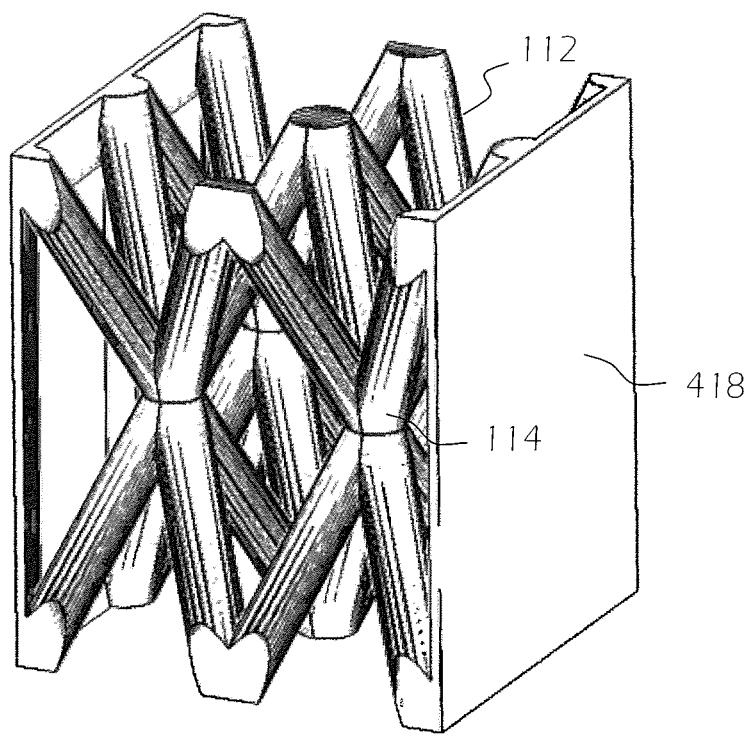
Figure 6D:
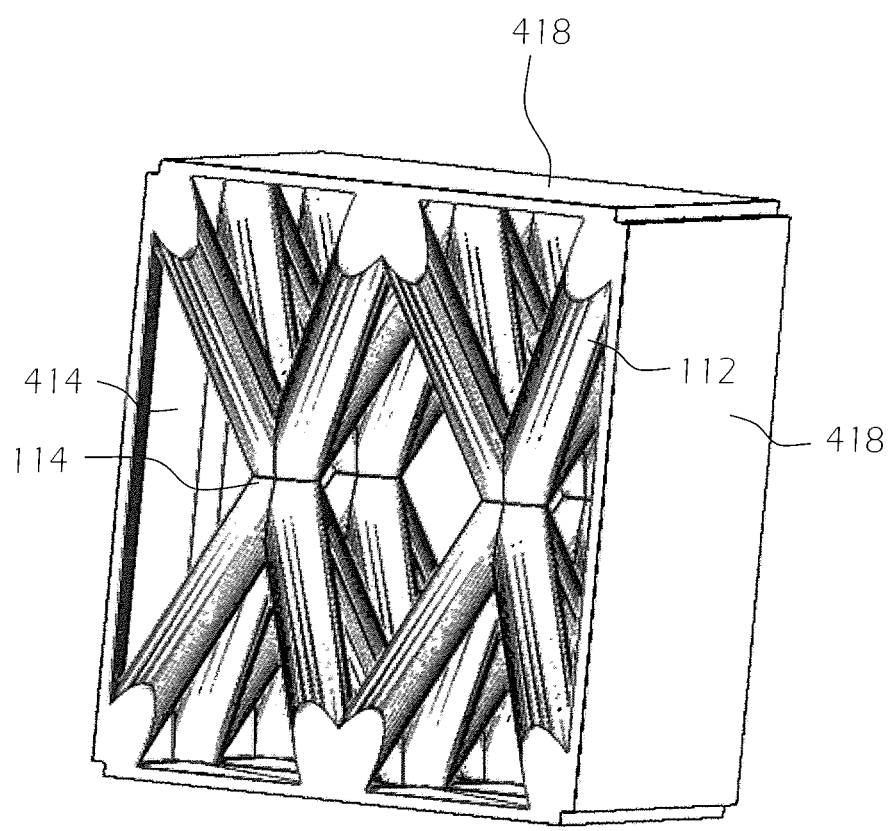

Referring to FIGS. 6A-6D, multiple embodiments are possible in which the interior fluid volume is sealed and the exterior fluid volume is not sealed or sealed only partially by face sheets. In particular, face sheets may be completely absent (FIG. 6A), present on two surfaces (FIGS. 6B and 6C) or present on four surfaces (FIG. 6D). Other embodiments are also possible, in which face sheets are present on three or five surfaces, or in which the surface or surfaces of the hollow polymer micro-truss structure is or are curved.

Figure 7A:
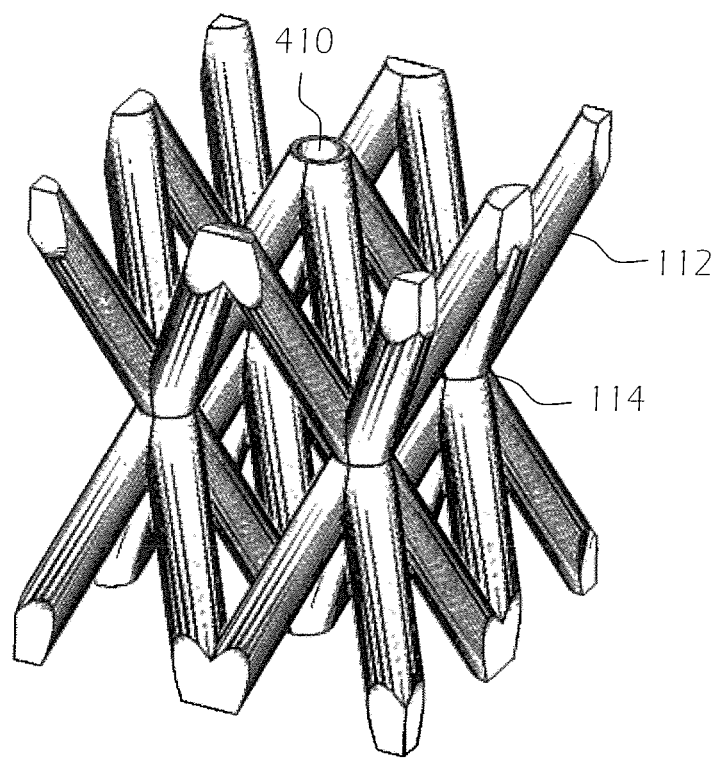
FIGS. 7A, 7B, 7C, 7D, and 7E are perspective views of hollow polymer micro-truss structures fabricated according to five additional embodiments of the present invention.
Figure 7B:
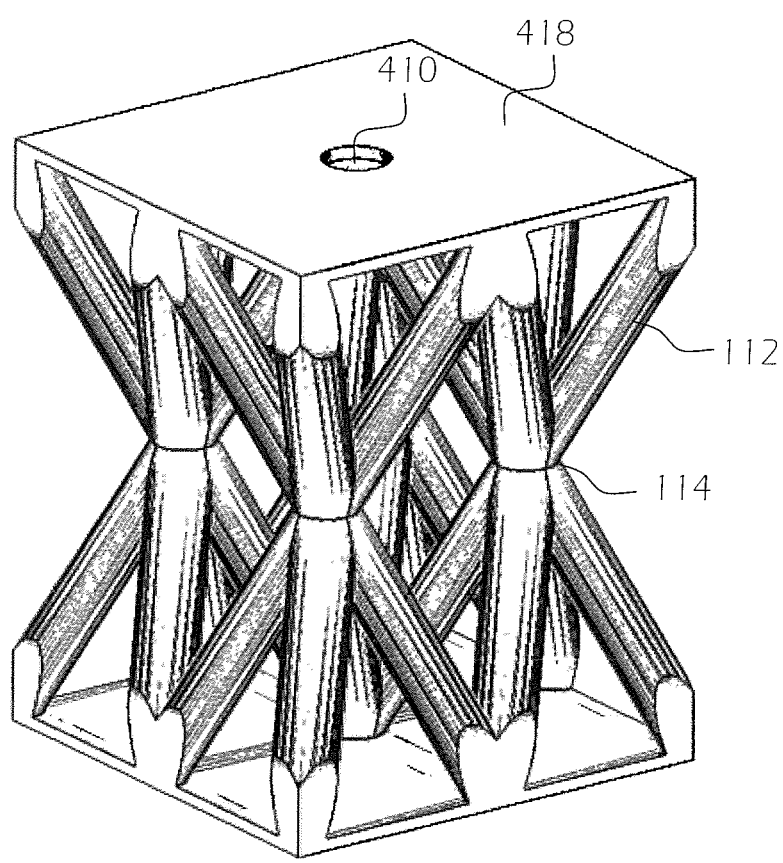
Figure 7C:
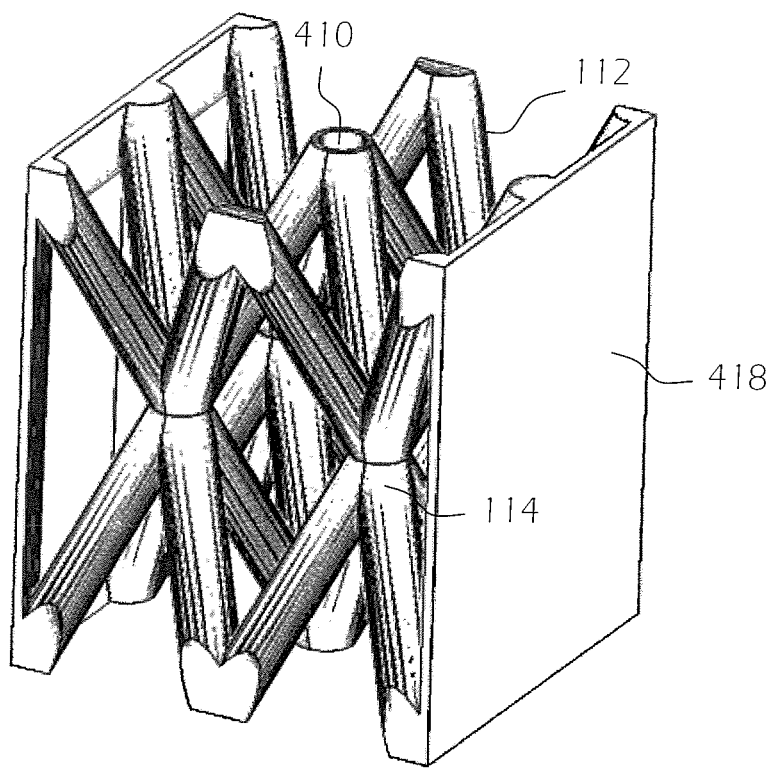
Figure 7D:
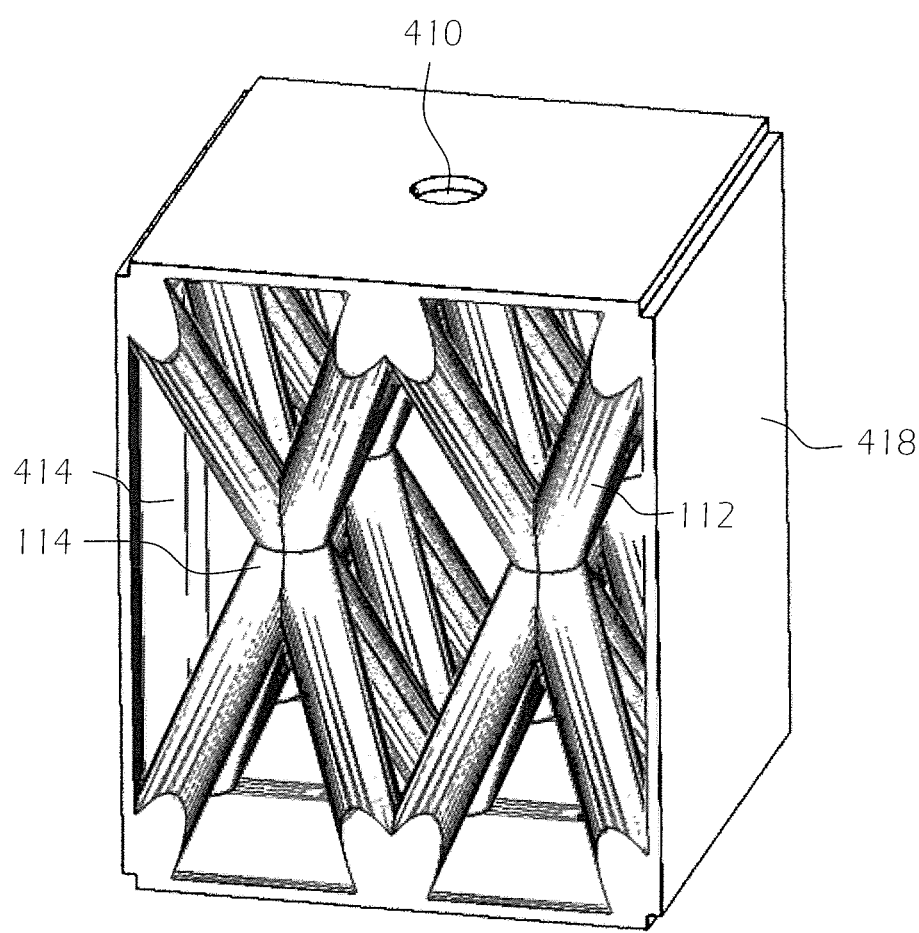
Figure 7E:
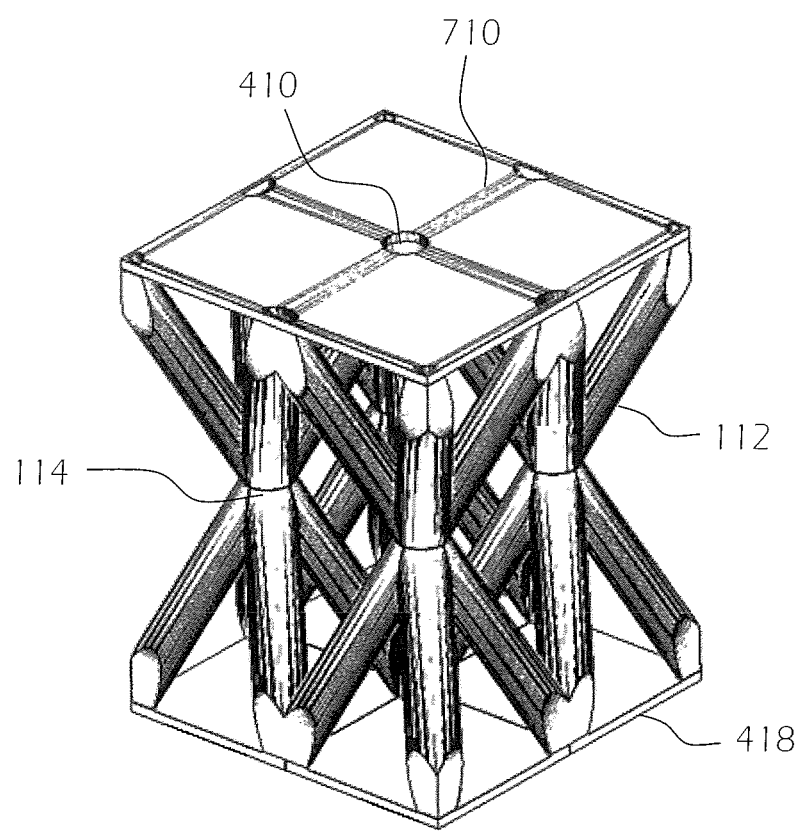

Referring to FIGS. 7A-7E, in other embodiments, fluid access ports 410 to the first fluid volume 412 may be provided without providing face sheets (FIG. 7A), or with two face sheets (FIGS. 7B, 7C, and 7E) or four face sheets (FIG. 7D). FIG. 7E illustrates an embodiment in which channels 710 in the face sheets provide connecting passages between the fluid access ports 410 to the first fluid volume 412, forming a manifold. FIG. 1 shows another embodiment in this category, in which face sheets are absent. In the embodiment of FIG. 1, multiple fluid access ports 410 to the first fluid volume 412 are provided.

The present invention may be used to construct inflatable micro-truss structures, micro-truss structures which may be pressurized, micro-truss structures which may be actuated by means other than inflating, and cross flow heat exchangers with polymeric walls. In each of these categories, the present invention has a range of applications.

In the category of inflatable micro-truss structures and micro-truss structures which may be pressurized, either the interior fluid volume may be filled with a gas at higher pressure than the exterior fluid volume or the exterior fluid volume may be filled with a gas at higher pressure than the interior fluid volume. The former of these alternatives is preferred. Alternatively, either the interior fluid volume or the exterior fluid volume, or both, may be filled with a liquid or multi-phase fluid. In such an embodiment, the structures may be inflated or deflated either locally or globally, either actively, by having fluid pumped into or out of them, or passively, for example by inflation by gas produced by evaporation or sublimation. Local inflation may be produced, for example, by producing a flow in the fluid, resulting in a pressure gradient, in the interior fluid volume, so that parts of the interior fluid volume may be inflated to an extent different from other parts. In another embodiment, multiple hollow polymer micro-truss structures may be separately fabricated and sealed, and then secured together to form a composite structure within which different portions may be inflated or deflated independently.

Deployable structures may be fabricated in this manner. This may be especially useful for space applications, where specific applications may include deployable radiators, booms, antennas, and the like. Such a deployable structure may be inflated once for permanent deployment, or it may be alternately inflated and deflated, to deploy and store it repeatedly. In some such applications it may be useful to fabricate the hollow polymer micro-truss structure out of an electrically conductive elastomer.

Inflatable porous cushions may also be fabricated in this manner. In such an application, the region which is not inflated permits airflow, which enables simultaneous support via uniform distributed pressure, and ventilation, or convective cooling, or both. As a cushion, such a device may provide an energy absorption capability, e.g., by absorbing energy due to an impact. Specific applications may include seating, head rests, and arm rests, in airplanes, automobiles, or other forms of transportation, or in stationary seating. In this case, the cushion may adjust comfort and airflow simultaneously. Inflatable porous cushions may also be used as padding for protective equipment such as armor or athletic padding, or as an inflatable, insulating breathable cushion for cold weather clothing, or for shoe padding, an application in which the hollow polymer micro-truss structure's characteristics of being lightweight, inflatable, long-lasting, and odor-resistant are beneficial.

Inflatable structures for medical and personal care applications may also be fabricated in this manner. In such an application, the region which is not inflated may permit airflow. In particular, the interior fluid volume may be pressurized to inflate the hollow polymer micro-truss structure, and the exterior fluid volume may be open, allowing air to flow freely within the second fluid region, and, for example, to the limb of a patient, which may be supported by an inflatable structure fabricated according to an embodiment of the present invention. Such a structure may enable simultaneous support, via uniform distributed pressure, and ventilation, or convective cooling, or both. The exterior fluid volume may be used to apply a vacuum; in this embodiment the structure enables support, via uniform distributed pressure, while simultaneously making it possible to apply a vacuum to the surface being supported, for faster wound healing. Specifically, such a structure may be used for inflatable casts, to increase healing rate and prevent sores, for hospital bedding, or domestic bedding, to prevent bedsores, in a diaper or feminine pad, where it may prevent rash, in wheelchairs, as crutch padding, and in prosthetics.

Such a structure may also be used in a wound care bandage, where it may be able to apply pressure to stop bleeding, and vacuum to promote healing. In this case, the volume through which vacuum is applied may be partially or entirely filled with another material, such as random open-cell foam, or a micro-truss with smaller unit cell size, or another hollow polymer micro-truss structure with smaller unit cell size. Such a composite structure may also be suitable for use in inflatable casts.

A structure including a polymer micro-truss structure with smaller unit cell size may be formed within the spaces in a structure with a larger unit cell size, i.e., in a larger-scale structure, by performing a second exposure of photopolymerizable resin, using a mask having smaller hole spacing than the first mask. In one embodiment this second exposure is performed before the unreacted resin is washed away. In another embodiment, the hollow, or solid, polymer micro-truss structure may be immersed in a fresh bath of photopolymerizable resin prior to the second exposure. A structure formed entirely of tubes and hollow nodes will result if both the larger-scale and smaller-scale micro-truss structures are fabricated first, to form a sacrificial scaffold, prior to forming a polymer coating. A structure formed of a combination of solid micro-truss elements and hollow micro-truss elements may be formed by immersing a hollow polymer micro-truss structure in a tray of photopolymerizable resin and exposing it to collimated light through a mask.

Control structures may also be fabricated in this manner. For example, the pressure in the interior fluid volume of a hollow polymer micro-truss structure may be increased relative to the pressure in the exterior fluid volume, causing the hollow tubes to increase in diameter, restricting the flow of fluid in the exterior fluid volume, and facilitating the flow of fluid in the interior fluid volume. Conversely, the pressure in the exterior fluid volume of a hollow polymer micro-truss structure may be increased relative to the pressure in the interior fluid volume, causing the hollow tubes to decrease in diameter, restricting the flow of fluid in the interior fluid volume, and facilitating the flow of fluid in the exterior fluid volume. In this application, the pressure difference between the fluids in the two fluid volumes may also be used to control heat flow in either fluid. For example, increasing the pressure in the interior fluid volume may restrict the flow of fluid in the exterior fluid volume and thereby reduce heat flow that might be taking place as a result of natural or forced convection. Such an embodiment may be used in heat transfer or climate control systems, such as passenger air conditioning. In another example, increasing the pressure in the interior fluid volume may allow forced convection in the interior fluid volume to operate more effectively, resulting in increased heat flow in the interior fluid volume. Similarly, changing the pressure in the interior or exterior fluid volume may change the rate of flow of electricity, if the electric current is being carried by ions in solution in either the interior or exterior fluid volume, or in both.

A reversibly collapsible medium may also be fabricated in this manner. Such a medium may consist of multiple hollow polymer micro-truss structures, selectively pressurized via, for example, multiple fluid access ports to the respective interior fluid volumes. The temperature of the entire medium, or of portions of it, may then be varied near the glass transition temperature of the wall material of the tubes in the hollow polymer micro-truss structures to alter the stiffness of the polymer micro-truss structures, allowing portions of the medium to expand or collapse under the effects of gravity or other, externally applied, forces.

Mechanisms and/or methods for actuating a compliant surface may also be fabricated in this manner. In an embossing application, for example, a hollow polymer micro-truss structure may be fabricated in the shape to be embossed, with reduced thickness when deflated, and the desired profile when inflated. It may then be inflated after being placed in contact with the part on which embossing is to be performed, to force the part into the desired shape.

Robots that use inflation for locomotion may also be fabricated in this manner. In the field of robotics, the hollow polymer micro-truss structure is a versatile actuator capable of changing its shape, overall size, and mechanical properties in response to changes in the pressure in the interior or exterior fluid volume.

In the category of micro-truss structures which may be actuated by mechanisms/methods other than inflating, one mechanism/method of actuation involves the use of dielectric elastomers. In one embodiment, the interior surface of one or more of the tubes may have a conductive coating which acts as one electrode of a capacitor, and the outer surface may also have a conductive coating, which may act as the other electrode. A potential applied across the electrodes may then result in a compressive radial pressure inwards on the outer surface, and outwards on the inner surface, of the tube wall, causing the tube wall thickness to be reduced. For wall material with a suitable Poisson's ratio or shear modulus, this may result in the tube's dimensions increasing in another direction, causing the tube to lengthen, for example, or shorten when the potential is removed. In one embodiment such a lengthening or shortening of the tubes may result in the hollow polymer micro-truss structure expanding or contracting in three dimensions, converting electrical energy to translational, or lateral actuation. For a hollow polymer micro-truss structure in the form of a relatively thin sheet, lengthening of the tubes in the structure may result, for suitably oriented tubes, in largely planar expansion of the structure, and corresponding planar, i.e., anisotropic, actuation. Specific applications include actuation of a compliant surface, e.g. for stamping, or embossing, and deployable structures, which are especially useful for space. In particular, deployable structures for space may include deployable radiators, booms, antennas. Antennas fabricated in this manner may have wavelengths that are tunable by adjusting the dimensions of the polymer micro-truss structure, and it may be possible to stiffen them using shape memory alloys (SMAs) or shape memory polymers (SMPs).

In the category of cross flow heat exchangers with polymeric walls, the use of a hollow polymer micro-truss structure makes it possible to form a heat exchanger in which the flow may be adjusted by adjusting the pressure difference between the interior and exterior fluid volumes. Moreover, an ultrathin wall thickness can enable very small cell sizes, and produce high specific surface area for volumetrically efficient heat transfer.

Although limited embodiments of hollow polymer micro-truss structures have been specifically described and illustrated herein, many modifications and variations will be apparent to those skilled in the art. Accordingly, it is to be understood that hollow polymer micro-truss structures constructed according to principles of this invention may be embodied other than as specifically described herein. The invention is also defined in the following claims and equivalents thereof.

What is claimed is:

1. A hollow micro-truss comprising:
   at least three sets of continuous interconnected hollow tubes extending along at least three different directions; and
   a face sheet at one side of the interconnected hollow tubes,
   the at least three sets of interconnected hollow tubes interpenetrating each other at a plurality of hollow nodes extending along different directions, one of the directions not being in a plane defined by one or more of the other directions, to form a self-supporting structure,
   the at least three sets of interconnected hollow tubes having walls,
   an inner diameter of the hollow tubes is at least 10 microns and at most 2 millimeters,
   an interior of the hollow tubes defined by the walls being in fluid communication with each other at the hollow nodes to form a continuous interior fluid volume,
   at least some of the interconnected hollow tubes terminating at fluid access ports to provide fluid communication between the continuous interior fluid volume and outside the interconnected hollow tubes,
   the face sheet comprising a channel fluidly connecting at least two of the fluid access ports of the interconnected hollow tubes to each other,
   the continuous interior fluid volume configured to be filled with a gas at higher pressure than an exterior fluid volume, and
   the hollow micro-truss being a regular hollow polymer micro-truss.

2. The hollow micro-truss of claim 1, wherein the wall thickness of the hollow tubes is at least 10 nanometers and at most 0.5 millimeters.

3. The hollow micro-truss of claim 1, wherein a length of the hollow tubes is at least 40 microns and at most 25 millimeters.

4. The hollow micro-truss of claim 1, wherein the walls are configured such that the walls are capable of deforming to increase or decrease an inner diameter of the hollow tubes by an amount exceeding ten times the thickness of the walls without experiencing material failure.

* * * * *